(12) United States Patent
Yoshimoto et al.

(10) Patent No.: US 7,034,493 B2
(45) Date of Patent: Apr. 25, 2006

(54) MOTOR CONTROL APPARATUS AND MOTOR CONTROL METHOD

(75) Inventors: Kantaro Yoshimoto, Yokohama (JP); Yasuhiko Kitajima, Kamakura (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/814,237

(22) Filed: Apr. 1, 2004

(65) Prior Publication Data

US 2004/0195993 A1 Oct. 7, 2004

(30) Foreign Application Priority Data

Apr. 7, 2003 (JP) ............... 2003-102480

(51) Int. Cl.
*G05B 11/01* (2006.01)
*H02J 1/02* (2006.01)
*H02J 1/12* (2006.01)

(52) U.S. Cl. .................. 318/629; 318/798; 363/39; 363/40; 327/551

(58) Field of Classification Search ................ 318/767, 318/629, 727, 813, 432, 434, 798–803, 700, 318/710, 714, 721, 599; 363/39–41; 327/551
See application file for complete search history.

(56) References Cited

U.S. PATENT DOCUMENTS

| | | | |
|---|---|---|---|
| 6,674,262 B1 * | 1/2004 | Kitajima et al. ............ 318/722 |
| 6,727,675 B1 * | 4/2004 | Yoshimoto et al. ......... 318/700 |
| 6,768,280 B1 * | 7/2004 | Kitajima .................... 318/432 |
| 6,777,907 B1 * | 8/2004 | Ho .............................. 318/801 |
| 6,861,813 B1 * | 3/2005 | Yoshimoto et al. ......... 318/432 |
| 2005/0073280 A1 * | 4/2005 | Yoshinaga et al. .......... 318/727 |

FOREIGN PATENT DOCUMENTS

| EP | 1 276 225 A2 | 1/2003 |
|---|---|---|
| EP | 1 292 011 A2 | 3/2003 |
| JP | P2002-223600 | 8/2002 |

* cited by examiner

*Primary Examiner*—Marlon T. Fletcher
*Assistant Examiner*—Eduardo Colon Santana
(74) *Attorney, Agent, or Firm*—McDermott Will & Emery LLP

(57) ABSTRACT

A motor control apparatus having a fundamental wave current control circuit that implements feedback control on a fundamental wave component of a motor current in a dq coordinate system rotating in synchronization with the rotation of the motor and a higher harmonic current control circuit that implements feedback control on a higher harmonic components of the motor current in a dhqh coordinate system rotating with a frequency which is an integral multiple of the frequency of the fundamental wave component of the motor current, eliminates the higher harmonic component of the motor current from the control deviation between a fundamental wave current command value and a motor current feedback value.

9 Claims, 10 Drawing Sheets

MOTOR CONTROL APPARATUS AND MOTOR CONTROL METHOD

BACKGROUND OF THE INVENTION

1. Field of the Invention

The present invention relates to a motor control apparatus and a motor control method.

2. Description of the Related Art

Permanent magnet synchronous motors that do not require mechanical parts such as brushes, which become worn, and are compact and highly efficient are utilized widely as drive motors in electric cars and the like. In an ideal permanent magnet synchronous motor, the armature magnetic flux linkage generated by the permanent magnet changes sinusoidally relative to the phase. However, if there is any distortion in the magnetic flux, the vector control normally implemented on the motor current does not effectively prevent the occurrence of torque rippling and deterioration in the motor efficiency attributable to the higher harmonic components of the motor current.

There is a motor control apparatus in the known art that addresses the problem described above by individually controlling the fundamental wave component and the higher harmonic component of the motor current respectively in a dq coordinate system and a dhqh coordinate system that rotate in synchronization with the corresponding current components (see Japanese Laid Open Patent Publication No. 2002-223600)

SUMMARY OF THE INVENTION

However, the following problem occurs in the motor control apparatus in the related art described above when the higher harmonic current command value is changed through higher harmonic current control.

In the higher harmonic current control, the higher harmonic component contained in a motor current is extracted and after the higher harmonic current component is converted to a value in the dhqh coordinate system, a higher harmonic current controller implements control so as to match the higher harmonic current with a higher harmonic current command value. In the fundamental wave current control, the motor current having been detected is converted to a value in the dq coordinate system and then a fundamental wave current controller implements control so as to match the fundamental wave current with a fundamental wave current command value.

The motor current input to the fundamental wave current controller contains the higher harmonic component. The fundamental wave current controller, which implements control so as to match the motor current with the fundamental wave current command value, tries to suppress the higher harmonic current component. As a result, during a transient response in the current, the conformity of the higher harmonic current to its command value becomes affected and it becomes difficult to achieve the level of higher harmonic current control response desired in the control design specifications.

The present invention provides a motor control apparatus and a motor control method that improves the conformity of the higher harmonic current to the command value in the higher harmonic current control.

A motor control apparatus according to the present invention comprises a fundamental wave current control device that implements feedback control on a fundamental wave component of a motor current flowing to a 3-phase AC motor in a dq coordinate system rotating in synchronization with the rotation of the motor, a higher harmonic current control device that implements feedback control on a higher harmonic component of the motor current in a dhqh coordinate system rotating with a frequency which is an integral multiple of a frequency of the fundamental wave component of the motor current, a command value calculating device that calculates an AC voltage command value by adding an output from the fundamental wave current control device to an output from the higher harmonic current control device and outputs the AC voltage command value to a power conversion device that generates a 3-phase AC voltage corresponding to the AC voltage command value, and a higher harmonic component eliminating device that eliminates the higher harmonic component of the motor current from a control deviation between a motor current feedback value and a fundamental wave current command value in the fundamental wave current control device.

In a method for controlling a motor according to the present invention by employing circuits including a fundamental wave current control circuit that implements feedback control on a fundamental wave component of a motor current in a dq coordinate system and a higher harmonic current control circuit that implements feedback control on a higher harmonic component of the motor current in a dhqh coordinate system, the higher harmonic components of the motor current is eliminated from a control deviation between a fundamental wave current command value and a motor current feedback value in the fundamental wave current control circuit, an AC voltage command value is calculated by adding an output from the fundamental wave current control circuit from which the higher harmonic component has been eliminated to an output from the higher harmonic current control circuit and a 3-phase AC voltage corresponding to the AC voltage command value is generated and the 3-phase AC voltage is applied to a 3-phase AC motor.

DETAILED DESCRIPTION OF THE PREFERRED EMBODIMENTS

Figure 1:
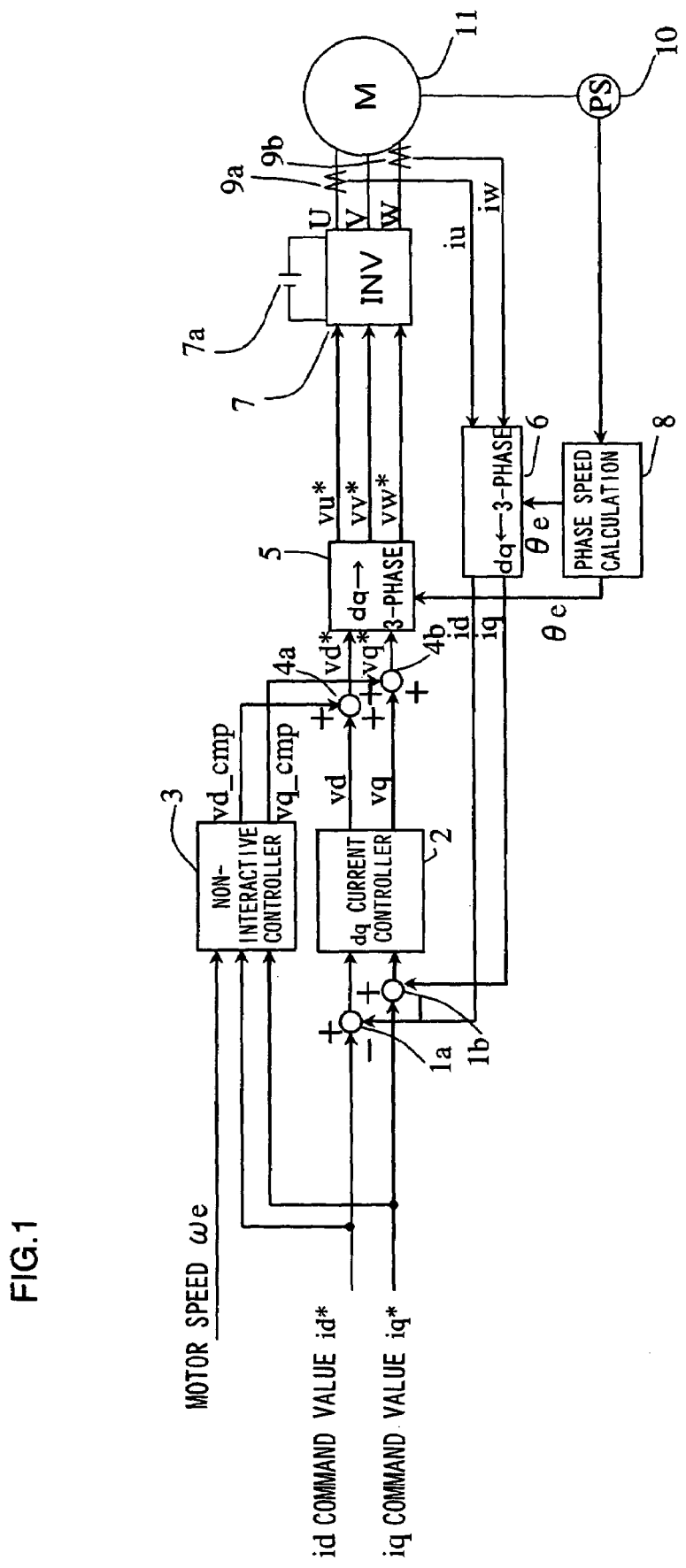
FIG. 1 is a control block diagram of a 3-phase synchronous motor controlled through standard vector control.

Expression (1) presented below is a circuit equation pertaining to a permanent magnet synchronous motor driven with a 3-phase alternating current.

$$\begin{bmatrix} v_u \\ v_v \\ v_w \end{bmatrix} = \begin{bmatrix} R+pL_u & pM_{uv} & pM_{wu} \\ pM_{uv} & R+pL_v & pM_{vw} \\ pM_{wu} & pM_{vw} & R+pL_w \end{bmatrix} \begin{bmatrix} i_u \\ i_v \\ i_w \end{bmatrix} + \begin{bmatrix} e_u \\ e_v \\ e_w \end{bmatrix} \quad (1)$$

In expression (1), vu, vv and vw represent the voltages at the individual phases (U-phase, V-phase and W-phase), iu, iv and iw represent the currents at the individual phases, eu, ev and ew represent the speed electromotive forces at the individual phases attributable to the magnet, Lu, Lv and Lw represent the self-inductances at the individual phases, Muv, Mvw and Mwu represent mutual inductances between the phases, R represents the armature resistance and p represents a differential operator (=d/dt).

When the inductances are expressed by incorporating the spatial changes in the inductances, the self-inductances are expressed as in expression (2) below and the mutual inductances are expressed as in expression (3).

$$L_u = L_0 + \sum L_n \cos 2n\theta_e \quad (2)$$
$$L_v = L_0 + \sum L_n \cos n\left(2\theta_e + \frac{2}{3}\pi\right)$$
$$L_w = L_0 + \sum L_n \cos n\left(2\theta_e - \frac{2}{3}\pi\right)$$

$$M_{uv} = -\frac{1}{2}L_0 + \sum L_n \cos n\left(2\theta_e - \frac{2}{3}\pi\right) \quad (3)$$
$$M_{vw} = -\frac{1}{2}L_0 + \sum L_n \cos 2n\theta_e$$
$$M_{wu} = -\frac{1}{2}L_0 + \sum L_n \cos n\left(2\theta_e + \frac{2}{3}\pi\right)$$

In expressions (2) and (3) above, θe represents the electrical phase of the rotor. In addition, n is a natural number.

By taking into consideration the higher harmonic current component, the speed electromotive forces eu, ev and ew induced by the permanent magnet are expressed as in expression (4)

$$\begin{bmatrix} e_u \\ e_v \\ e_w \end{bmatrix} = -\omega_e \begin{bmatrix} \phi' \sin\theta_e + \sum \phi'_m \sin(m\theta_e) \\ \phi' \sin(\theta_e - 2/3\pi) + \sum \phi'_m \sin(m(\theta_e - 2/3\pi)) \\ \phi' \sin(\theta_e + 2/3\pi) + \sum \phi'_m \sin(m(\theta_e + 2/3\pi)) \end{bmatrix} \quad (4)$$

In expression (4), ωe represents the electrical angular speed, ø' represents the fundamental wave component in the flux linkage, øm' represents the higher harmonic component in the flux linkage and m represents a natural number equal to or greater than 2.

FIG. 1 is a control block diagram of a 3-phase synchronous motor which is controlled through standard vector control. In order to ensure that the explanation of the motor control apparatuses achieved in embodiments of the present invention which is described later is clearly understood, the vector control in the known art is first explained in reference to FIG. 1.

Current sensors 9a and 9b respectively detect a U-phase current iu and a W-phase current iw at a 3-phase synchronous motor 11. A dq←3-phase converter 6 executes a coordinate conversion to convert the currents iu and iw detected by the current sensors 9a and 9b to currents id and iq in a dq coordinate system. The dq coordinate system rotates in synchronization with the fundamental wave component of the magnetic flux at the 3-phase synchronous motor 11.

The phase θe utilized by the dq←3-phase converter 6 when the coordinate conversion is executed represents the position of the rotor at the 3-phase synchronous motor 11 expressed as an electrical phase. The rotor position is first detected with a rotary position sensor 10 such as an encoder or a resolver, and then, based upon the rotor position, the electrical phase θe is calculated by a phase speed computing unit 8. The phase speed computing unit 8 also calculates the electrical angular speed ωe of the 3-phase synchronous motor 11 through time differentiation of the phase θe.

The d-axis current id and the q-axis current iq obtained by the dq←3-phase converter 6 are controlled through feedback control so as to respectively match a d-axis current command value id* and a q-axis current command value iq*. First, subtractors 1a and 1b calculate current control deviations (id*−id) and (iq*−iq) of the d-axis current id and the q-axis current iq relative to the d-axis current command value id* and the q-axis current command value iq* respectively.

Next, a dq-axis current controller 2 implements PI control on the current control deviations (id*−id) and (iq*−iq). Namely, ad-axis control voltage vd and aq-axis control voltage vq which will set the current control deviations to 0 are determined.

A non-interactive controller 3 obtains a d-axis compensating voltage vd_cmp and a q-axis compensating voltage vq_cmp through expressions (5) and (6) presented below based upon the motor angular speed ωe, the d-axis current command value id* and the q-axis current command value iq*, in order to achieve a feed-forward compensation for the d-axis and q-axis interference.

$$vd\_cmp = -Lq \cdot \omega e \cdot iq^* \quad (5)$$

$$vq\_cmp = \omega e \cdot (Ld \cdot id^* + \text{ø}) \quad (6)$$

In expressions (5) and (6), Lq represents the fundamental wave component in the q-axis inductance, Ld represents the fundamental wave component in the d-axis inductance and ø=√(3/2)·ø'.

Adders 4a and 4b respectively calculate a d-axis control voltage command value vd* and a q-axis control voltage command value vq* by adding the compensating voltages vd_cmp and vq_cmp output by the non-interactive controller 3 to the d-axis control voltage vd and the q-axis control voltage vq output by the dq-axis current controller 2.

A dq→3-phase converter 5 converts the d-axis control voltage vd* and the q-axis control voltage vq* to 3-phase voltage command values vu*, vv* and vw*. An inverter 7 executes a PWM (pulse width modulation) control based upon the 3-phase voltage command values vu*, vv* and vw*, thereby converting the DC power from a DC source 7a to 3-phase AC power. The 3-phase AC power resulting from the conversion is then supplied to the 3-phase synchronous motor 11.

When the vector control is implemented by regarding a higher harmonic current in the 3-phase synchronous motor 11 as a higher harmonic current in the dq coordinate system, there is a limit imposed with regard to the response frequency of the d-axis current and the q-axis current in correspondence to the control cycle and the gain set at the PI current controller, and thus, it is difficult to control a higher harmonic current with a high-frequency. Accordingly, a higher harmonic current in the motor is controlled in a coordinate system which rotates at a rate that is an integral multiple of the fundamental wave components of the motor currents, as explained later.

First Embodiment

Figure 2:
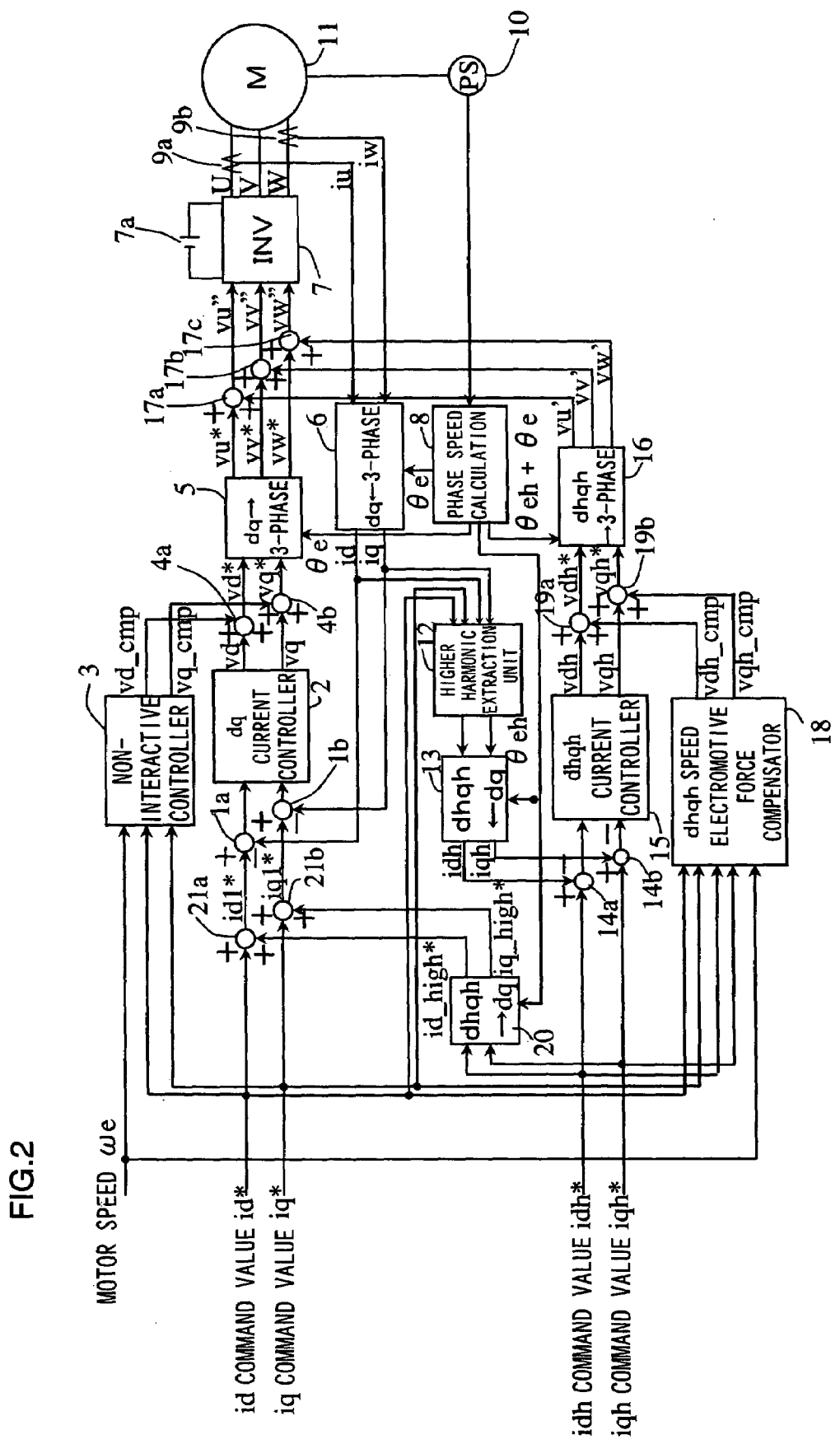
FIG. 2 is a control block diagram showing the structure of the motor control apparatus in a first embodiment.

FIG. 2 is a block diagram of the structure adopted in the motor control apparatus in the first embodiment. It is to be noted that the same reference numerals are assigned to components identical to those shown in FIG. 1, and the following explanation focuses on the differences from the apparatus shown in FIG. 1.

A new coordinate system, i.e., a dhqh coordinate system, which rotates in synchronization with the higher harmonic current that is a target of control, is set and the higher harmonic current is controlled in the dhqh coordinate system. The motor control apparatus in FIG. 2 includes a dq-axis current controller (fundamental wave current controller) 2 and a dhqh-axis current controller (higher harmonic current controller) 15, which can be integrated in a single microprocessor.

The dq-axis current controller 2 implements feedback control on the fundamental wave component of the motor current in the dq-axis coordinate system which rotates in synchronization with the rotation of the motor 11. The dhqh-axis current controller 15 implements feedback control on the higher harmonic component of the motor current in the dhqh coordinate system. The dhqh coordinate system is an orthogonal coordinate system rotating with a frequency that is an integral multiple of the frequency of the fundamental wave component in the motor current.

Figure 3:
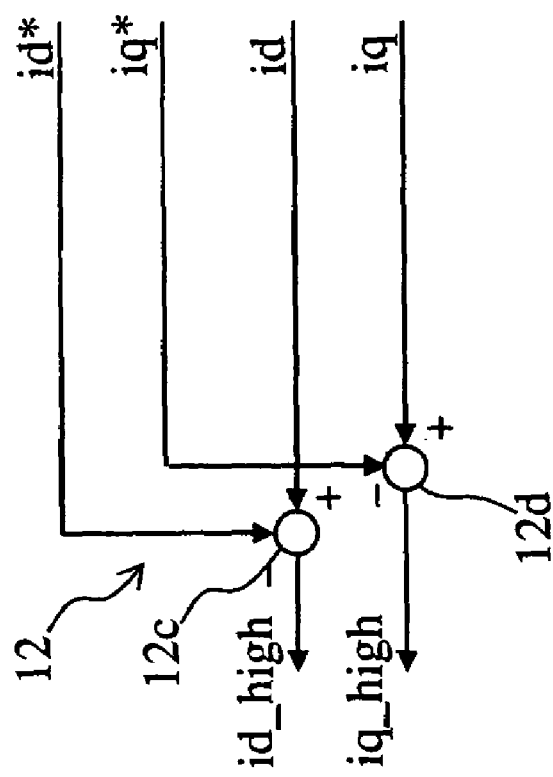
FIG. 3 shows in detail a structure that may be adopted in the higher harmonic extraction unit.

A higher harmonic extraction unit 12 extracts the higher harmonic currents contained in the d-axis current and q-axis current. FIG. 3 shows in detail the structure adopted in the higher harmonic extraction unit 12. As shown in FIG. 3, the d-axis and q-axis current command values id* and iq* are passed through low-pass filters (LPF) 12a and 12b and thus, estimated current response values id_i and iq_i are respectively obtained. The cutoff frequencies at the low-pass filters 12a and 12b should be set in advance to the control response frequency of the dq-axis current controller 2. The estimated current response value id_i thus obtained is subtracted from the d-axis current id by a subtractor 12c, and as a result, a d-axis higher harmonic current id_high is determined. Likewise, the estimated current response value iq_i is subtracted from the q-axis current iq by a subtractor 12d, and as a result, a q-axis higher harmonic current iq_high is determined.

Figure 4:
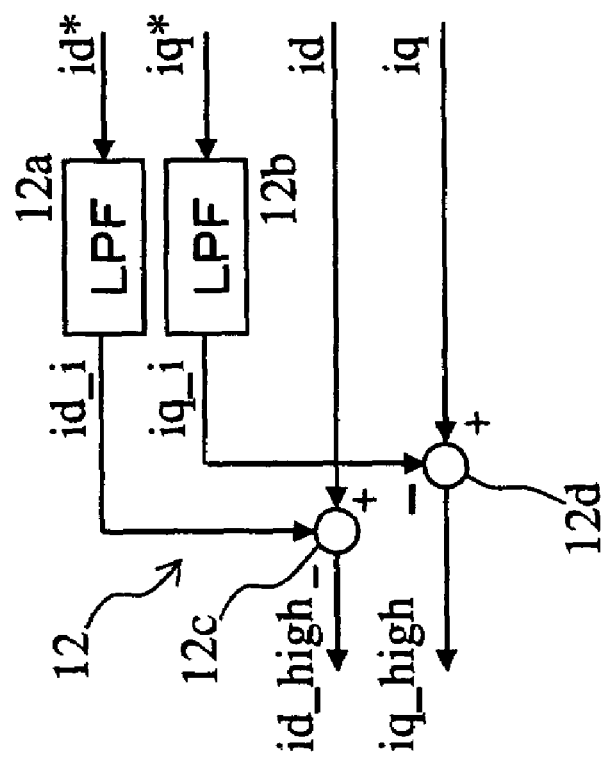
FIG. 4 shows in detail another structure that may be adopted in the higher harmonic extraction unit.

It is to be noted that the low-pass filters 12a and 12b in the higher harmonic extraction unit 12 may be omitted, as shown in FIG. 4. Namely, the value obtained by subtracting the d-axis current command value id* from the d-axis current id may be set as the d-axis higher harmonic current id_high, and the value obtained by subtracting the q-axis current command value iq* from the q-axis current iq may be set as the q-axis higher harmonic current iq_high.

When the estimated current response values id_i and iq_i shown in FIG. 3 are used, the d-axis current response and the q-axis current response both achieve values close to the response frequency set for the dq-axis current controller 2 on the control design stage. If, on the other hand, the low-pass filters 12a and 12b are omitted (see FIG. 4), the d-axis current response and the q-axis current response achieve values higher than the response frequency set on the control design stage.

The d-axis higher harmonic current id_high and the q-axis higher harmonic current iq_high obtained at the higher harmonic extraction unit 12 are input to a dhqh←dq converter 13. The dhqh←dq converter 13 converts id_high and iq_high respectively to values idh and iqh in the dhqh coordinate system. A phase θeh used by the dhqh←dq converter 13 when the coordinate conversion is executed can be determined through the following expression (7) by using the degree k of the higher harmonic in the dq coordinate system.

$$\theta eh = k \cdot \theta e \quad (7)$$

The relationship between the degree q of the higher harmonic current in the 3-phase AC coordinate system and the degree k of the higher harmonic current in the dq coordinate system is summarized in Table 1. For instance, the higher harmonic current of the fifth degree in the 3-phase AC coordinate system is equivalent to the higher harmonic current of the negative sixth (=−5−1) degree in the dq coordinate system, and the higher harmonic current of the seventh degree in the 3-phase AC coordinate system becomes the higher harmonic current of the sixth (=7−1) degree in the dq coordinate system.

TABLE 1

| DEGREE q IN THE 3-PHASE AC COORDINATE SYSTEM | DEGREE k IN THE dq COORDINATE SYSTEM |
| --- | --- |
| q = 1, 4, 7, . . . | k = q − 1 |
| q = 2, 5, 8, . . . | k = −q − 1 |

Subtractors 14a and 14b subtract the higher harmonic current idh and iqh in the dhqh coordinate system respectively from higher harmonic current command values idh* and iqh* and thus obtain higher harmonic current control deviations (idh*−idh) and (iqh*−iqh).

A dhqh-axis current controller 15, which may be constituted with, for instance, a PI controller, calculates control voltages vdh and vqh to set the higher harmonic current control deviations to 0.

A circuit equation in the dhqh coordinate system can be modified based upon expression (1) to the following expression (8).

$$\begin{bmatrix} v_{dh} \\ v_{qh} \end{bmatrix} = \begin{bmatrix} R & -\frac{3}{2}(k+1)L_0\omega \\ \frac{3}{2}(k+1)L_0\omega & R \end{bmatrix} \begin{bmatrix} i_{dh} \\ i_{qh} \end{bmatrix} + \frac{3}{2}L_0 p \begin{bmatrix} i_{dh} \\ i_{qh} \end{bmatrix} + \begin{bmatrix} e_{dh0} \\ e_{qh0} \end{bmatrix} + \frac{3}{2}(-k+1)L_1\omega \begin{bmatrix} \sin 2\theta_{eh} & \cos 2\theta_{eh} \\ \cos 2\theta_{eh} & -\sin 2\theta_{eh} \end{bmatrix} \begin{bmatrix} i_{dh} \\ i_{qh} \end{bmatrix} + \frac{3}{2}L_1 \begin{bmatrix} \cos 2\theta_{eh} & -\sin 2\theta_{eh} \\ -\sin 2\theta_{eh} & -\cos 2\theta_{eh} \end{bmatrix} \begin{bmatrix} pi_{dh} \\ pi_{qh} \end{bmatrix} + \sum_n [X_{ndhqh}] + \sum_m [e_{mdhqh}] \quad (8)$$

In expression (8), the spatial higher harmonics in the self-inductances and the mutual inductances and the spatial higher harmonics in the speed electromotive forces induced by the magnet are incorporated. The spatial higher harmonic component Xndhqh of the inductances are presented in Table 2, and the spatial higher harmonic component emdhqh of the speed electromotive forces induced by the magnet are presented in Table 3. Tables 2 and 3 indicate that the spatial higher harmonic component which is the primary cause of inducing the higher harmonic current can be expressed as a DC quantity.

$$\begin{bmatrix} v_{dh} \\ v_{qh} \end{bmatrix} = \begin{bmatrix} R & \frac{15}{2}L_0\omega \\ -\frac{15}{2}L_0\omega & R \end{bmatrix} \begin{bmatrix} i_{dh} \\ i_{qh} \end{bmatrix} + \frac{3}{2}L_0 p \begin{bmatrix} i_{dh} \\ i_{qh} \end{bmatrix} + \quad (9)$$

TABLE 2

SPATIAL HIGHER HARMONIC COMPONENT OF THE INDUCTANCE[$X_{ndhqh}$]

| dhqh COORDINATE CONVERSION $\theta_h = k\theta$ | n = 4, 7, 10 ... | n = 2, 5, 8 ... |
|---|---|---|
| k = 2n − 2 | $\frac{3}{2}(2n-1)L_n\omega \begin{bmatrix} 0 & 1 \\ 1 & 0 \end{bmatrix} \begin{bmatrix} i_d \\ i_q \end{bmatrix} + \frac{3}{2}L_n \begin{bmatrix} 1 & 0 \\ 0 & -1 \end{bmatrix} \begin{bmatrix} pi_d \\ pi_q \end{bmatrix}$ | AC COMPONENT |
| k = −(2n + 2) | AC COMPONENT | $-\frac{3}{2}(2n+1)L_n\omega \begin{bmatrix} 0 & 1 \\ 1 & 0 \end{bmatrix} \begin{bmatrix} i_d \\ i_q \end{bmatrix} + \frac{3}{2}L_n \begin{bmatrix} 1 & 0 \\ 0 & -1 \end{bmatrix} \begin{bmatrix} pi_d \\ pi_q \end{bmatrix}$ |

TABLE 3

SPATIAL HIGHER HARMONIC COMPONENT OF THE SPEED ELECTROMOTIVE FORCE INDUCED BY THE PERMANENT MAGNET [$e_{mdhqh}$]

| dhqh COORDINATE CONVERSION $\theta_h = k\theta$ | m = 4, 7, 10 ... | m = 2, 5, 8 ... |
|---|---|---|
| k = m − 1 | $\begin{bmatrix} 0 \\ m\sqrt{\frac{3}{2}}\phi'_m\omega \end{bmatrix}$ | AC COMPONENT |
| k = −m − 1 | AC COMPONENT | $\begin{bmatrix} 0 \\ -m\sqrt{\frac{3}{2}}\phi'_m\omega \end{bmatrix}$ |

In expression (8), the terms pertaining to the speed electromotive forces include terms attributable to idh and iqh, terms attributable to id and iq and terms attributable to the higher harmonic component in the magnetic flux generated by the magnet. These speed electromotive forces constitute an external disturbance to the higher harmonic current control implemented in the dhqh coordinate system. A dhqh speed electromotive force compensator 18 is a feed-forward compensator which compensates for the adverse effect of the speed electromotive forces.

Let us now assume 2 for the degree n of the inductance spatial higher harmonics, 5 for the degree m of the spatial higher harmonic of the magnetic flux generated by the magnet and −6 for the degree k used for the dhqh coordinate conversion. By using these values for substitution in expression (8), the dhqh circuit equation can be expressed as in (9) below.

-continued $$\begin{bmatrix} e_{dh0} \\ e_{qh0} \end{bmatrix} + \frac{21}{2}L_1\omega \begin{bmatrix} \sin 2\theta_h & \cos 2\theta_h \\ \cos 2\theta_h & -\sin 2\theta_h \end{bmatrix} \begin{bmatrix} i_{dh} \\ i_{qh} \end{bmatrix} +$$

$$\frac{3}{2}L_1 \begin{bmatrix} \cos 2\theta_h & -\sin 2\theta_h \\ -\sin 2\theta_h & -\cos 2\theta_h \end{bmatrix} \begin{bmatrix} pi_{dh} \\ pi_{qh} \end{bmatrix} -$$

$$\frac{15}{2}L_2\omega \begin{bmatrix} 0 & 1 \\ 1 & 0 \end{bmatrix} \begin{bmatrix} i_d \\ i_q \end{bmatrix} + \frac{3}{2}L_2 \begin{bmatrix} 1 & 0 \\ 0 & -1 \end{bmatrix}$$

$$\begin{bmatrix} pi_d \\ pi_q \end{bmatrix} + \begin{bmatrix} 0 \\ -5\sqrt{3/2}\,\phi'_5\,\omega \end{bmatrix}$$

Figure 5:
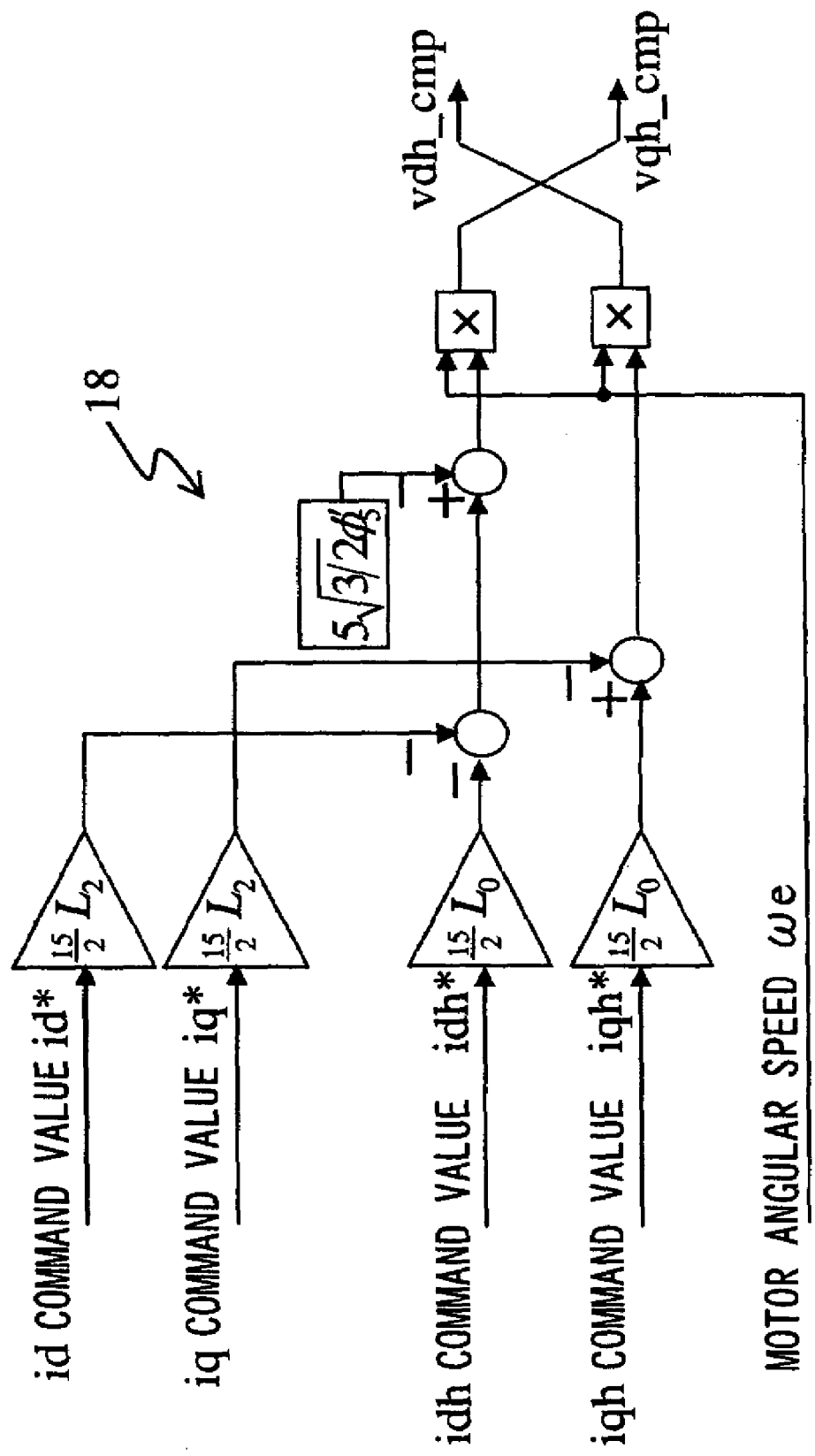
FIG. 5 shows in detail a structure that may be adopted in the dhqh speed electromotive force compensator.

FIG. 5 shows the structure adopted in the dhqh speed electromotive force compensator 18. The dhqh speed electromotive force compensator 18 calculates control voltages vdh_cmp and vqh_cmp based upon the d-axis current command value id*, the q-axis current command iq*, the dh-axis current command value idh*, the qh-axis current command value iqh*, the motor angular speed ωe, the inductances L0 and L2 and the parameter of the higher harmonic component ø5' of the magnetic flux.

Adders 19a and 19b respectively add the control voltages vdh and vqh determined at the dhqh-axis current controller 15 to the control voltages vdh_cmp and vqh_cmp having been calculated, and thus obtain dhqh control voltages vdh* and vqh*.

A dhqh→3-phase converter 16 converts the dhqh control voltages vdh* and vqh* to 3-phase AC voltages vu', vv' and vw'. Adders 17a, 17b and 17c add the 3-phase AC voltages vu', vv' and vw' respectively to the control voltages vu*, vv* and vw* obtained through the dq-axis current control and thus obtain voltage command values vu", vv" and vw" in correspondence to the individual phases.

By adding such a higher harmonic current control system to the standard vector control system, it becomes possible to control the higher harmonic current in the motor with better response compared to the response achieved in the standard vector control alone. It is to be noted that when a plurality of degrees of the higher harmonic current are controlled, a higher harmonic current control system should be added in correspondence to each degree of higher harmonic current to be controlled.

Figure 6:
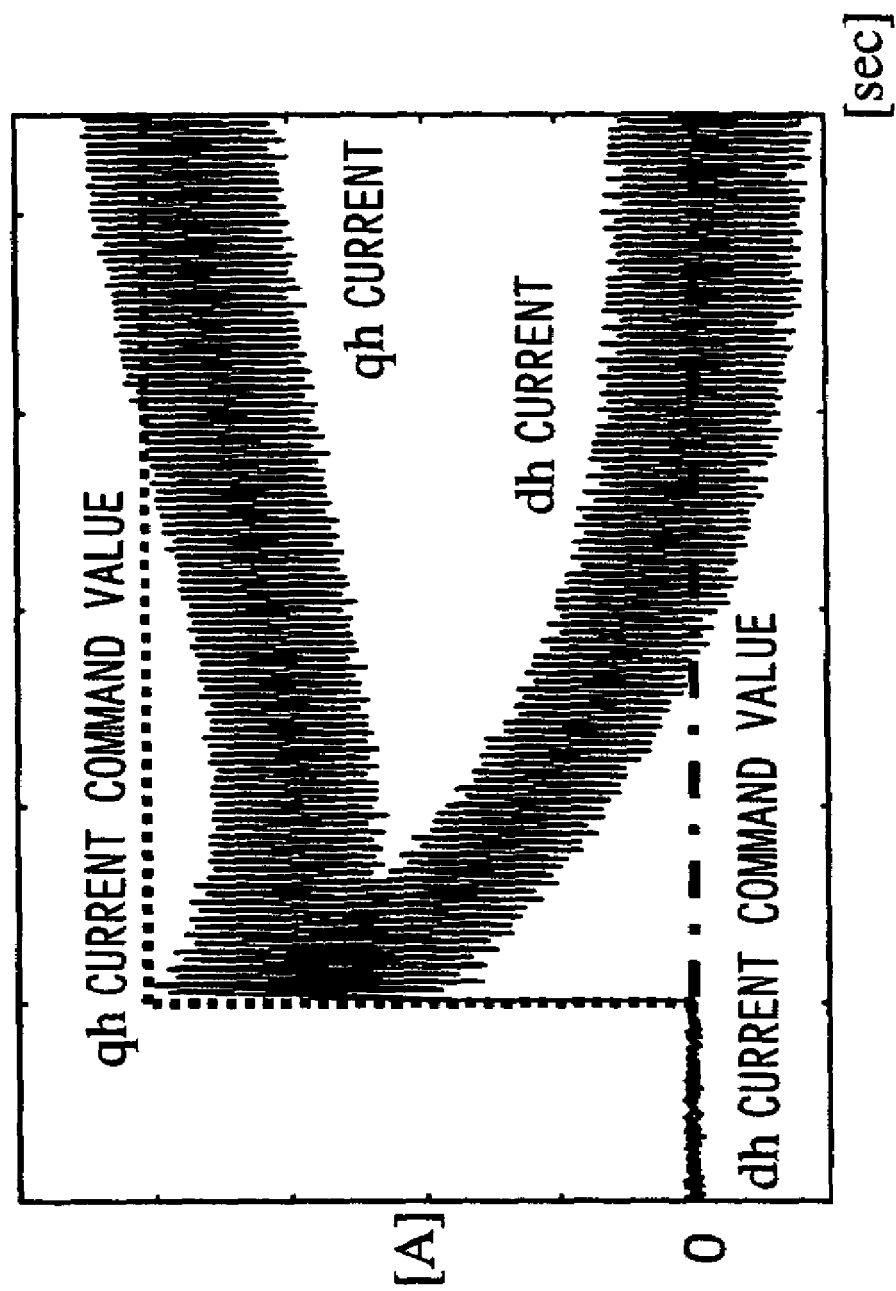
FIG. 6 illustrates the dh-axis current response and the qh-axis current response achieved by changing the qh current control command value in steps through the higher harmonic current control implemented in conjunction with the structure shown in FIG. 2.

FIG. 6 shows the dh-axis current response and the qh-axis current response achieved by changing the qh current command value in steps through the higher harmonic current control implemented in the structure described above. A disturbance is observed both in the dh current and the qh current in the transient response. This disturbance occurs for the following reason. Namely, the d-axis current id and the q-axis current iq input to the dq-axis current controller 2 both contain the higher harmonic component. Since the dq-axis current controller 2 determines the control output so as to match the d-axis current id and the q-axis current iq respectively with the current command values id* and iq*, it tries to suppress the higher harmonic component. In other words, since the dq-axis current controller 2 interferes with the dhqh-axis current control, the conformity of the dhqh higher harmonic currents to the respective command values is adversely affected in the current transient response.

In order to address the problem with regard to the current response described above, the motor control apparatus in the first embodiment includes a dhqh→dq converter 20 and adders 21a and 21b. The dhqh→dq converter 20 converts the dh-axis current command value idh* and the qh-axis current command value iqh* respectively to values id_high* and iq_high* in the dq coordinate system. The coordinate conversion executed by the dhqh→dq converter 20 is expressed as in (10) below.

$$\begin{bmatrix} i^*_{d\_high} \\ i^*_{q\_high} \end{bmatrix} = \begin{bmatrix} \cos\theta_{eh} & -\sin\theta_{eh} \\ \sin\theta_{eh} & \cos 2\theta_{eh} \end{bmatrix} \begin{bmatrix} i^*_{dh} \\ i^*_{qh} \end{bmatrix} \quad (10)$$

The higher harmonic current command values id_high* and iq_high* resulting from the coordinate conversion are respectively added to the d-axis current command value id* and the q-axis current command value iq* by the adders 21a and 21b and thus, a d-axis current command value id1* and a q-axis current command value iq1* are determined (see expressions (11) and (12)).

$$id1^* = id^* + id\_high^* \quad (11)$$

$$iq1^* = iq^* + iq\_high^* \quad (12)$$

It is to be noted that the differences (current control deviations) between the d-axis current command value id1* and the d-axis current id calculated by the subtractor 1a and between the q-axis current command value iq1* and the q-axis current iq calculated by the subtractor 1b are input to the dq-axis current controller 2.

In the motor control apparatus in the first embodiment, the higher harmonic component values id_high* and iq_high* are respectively added to the d-axis current command value id* and the q-axis current command value iq* and then the d-axis current id and the q-axis current iq (feedback values) both containing the higher harmonic component are subtracted from the sums resulting from the addition, i.e., the d-axis current command value id1* and the q-axis current command value iq1*.

Namely, the higher harmonic component contained in the d-axis current command id1* and the q-axis current command value iq1* is cancelled out by the higher harmonic component contained in the d-axis current feedback value id and the q-axis current feedback value iq respectively, and, as a result, it is possible to prevent any higher harmonic component from being input to the dq-axis current controller 2. Thus, the higher harmonic current is not suppressed through the control implemented by the dq-axis current controller 2, and the current control in the dq coordinate system and the current control in the dhqh coordinate system can be implemented completely independently of each other.

When the higher harmonic current control with the poorer response in the related art is adopted in a drive motor in an electric vehicle that alternates acceleration and deceleration over frequent intervals, the conformity of a higher harmonic current to its command value is lowered and, as a result, the torque ripple occurring during an acceleration and deceleration is not lessened to a satisfactory degree. In contrast, the motor control apparatus in the first embodiment, which achieves an improvement in the conformity of the higher harmonic current to the respective command values in the higher harmonic current control, reduces the extent of torque ripple and improves the motor efficiency when the higher harmonic current control is adopted in a vehicle that accelerates and decelerates over frequent intervals.

The motor control apparatus in the first embodiment includes the non-interactive controller 3 and the adders 4a and 4b provided to compensate for any adverse effect of the d-axis and q-axis interference on the output vd and vq from the dq-axis current controller 2 based upon the d-axis current command value id* and the q-axis current command value iq* and the motor rotation speed we and, as a result, the adverse effect of the d-axis and the q-axis interference is eliminated to further improve the response of the fundamental wave current control. In addition, since the dhqh speed electromotive force compensator 18 and the adders 19a and 19b are provided to compensate for the adverse effect of the speed electromotive forces in the motor 11 on the output vdh and vqh from the dhqh current controller 15 based upon the d-axis current command value id* and the q-axis current command value iq*, the dh-axis current command value idh* and the qh-axis current command value iqh* and the motor rotation speed e, the adverse effect of the motor speed electromotive forces is eliminated to further improve the response of the higher harmonic current control.

Figure 7:
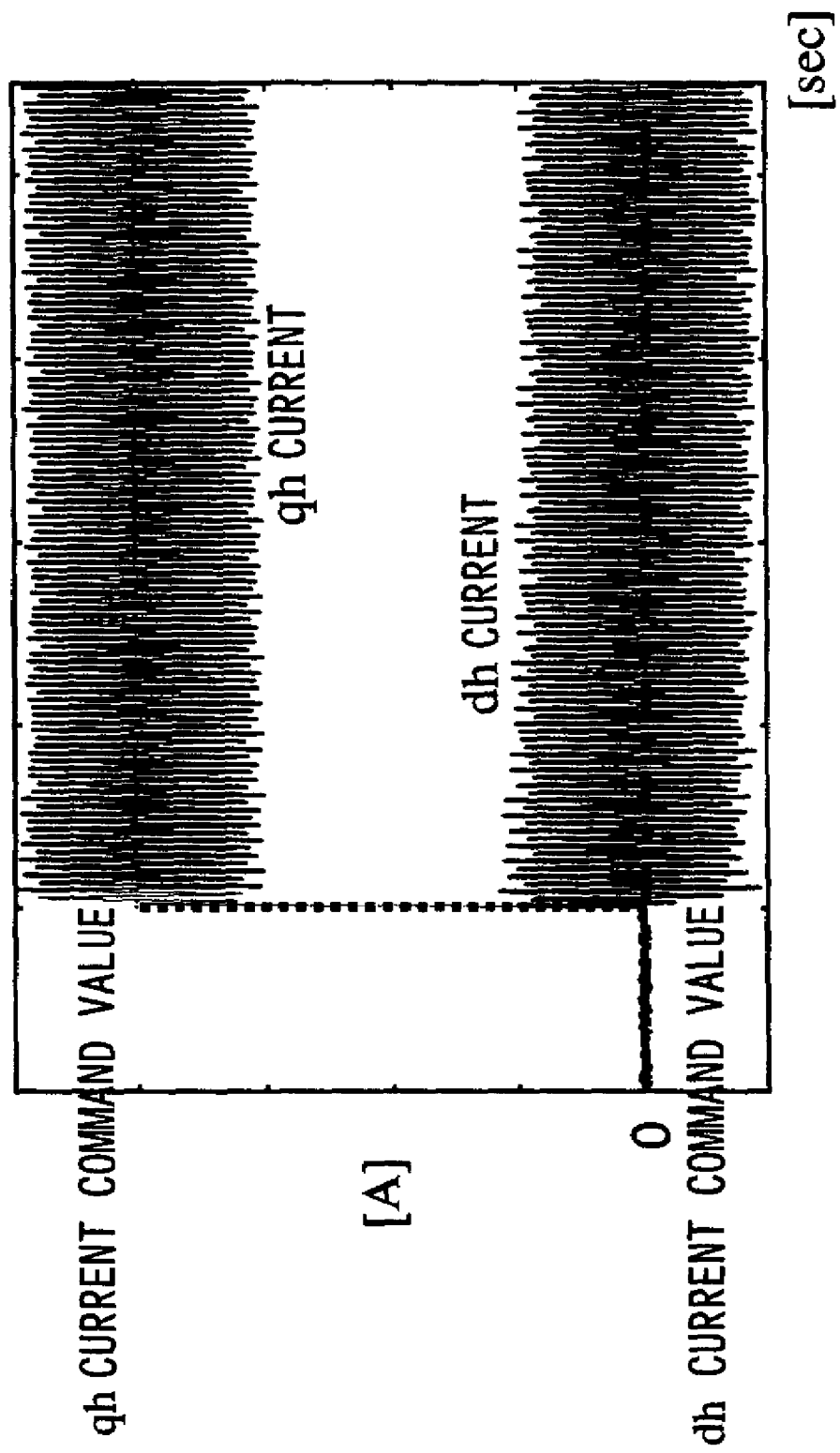
FIG. 7 shows the dh-axis current response and the qh-axis current response achieved by changing the qh current control command value in steps in the motor control apparatus in the first embodiment.

The dh-axis current response and the qh-axis current response achieved by changing in steps the qh current command value in the motor control apparatus in the first embodiment are shown in FIG. 7. FIG. 7 indicates that no disturbance causes in the current transient change and that a high level of conformity to the current command value is achieved.

Second Embodiment

Figure 8:
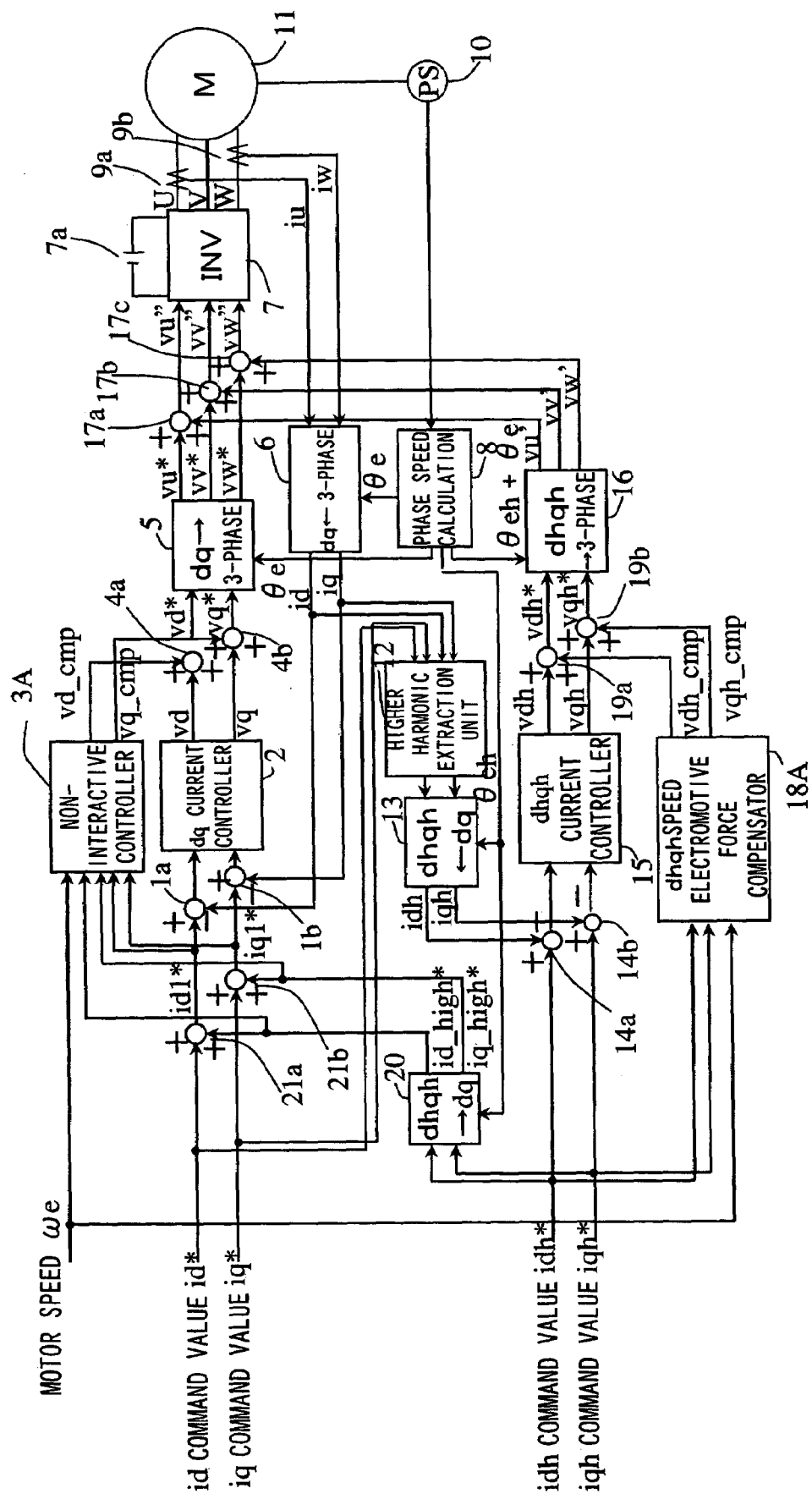
FIG. 8 is a control block diagram showing the structure of the motor control apparatus in a second embodiment.

FIG. 8 is a block diagram of the structure adopted in the motor control apparatus in the second embodiment. It is to be noted that the same reference numerals are assigned to components identical to those shown in FIGS. 1 and 2 and the following explanation focuses on the differences from the first embodiment.

In the motor control apparatus in the first embodiment, the d-axis current command value id* and the q-axis current command value iq* as well as the motor angular speed ωe are input to the non-interactive controller 3. In the motor control apparatus in the second embodiment, on the other hand, the higher harmonic current command values id_high* and iq_high* calculated based upon expression (10) and the d-axis current command value id1* and the q-axis current command value iq1* respectively calculated based upon expressions (11) and (12) are input in addition to the motor angular speed ωe to a non-interactive controller 3A. The non-interactive controller 3A calculates a d-axis compensating voltage vd_cmp and a q-axis compensating voltage vq_cmp through the following expressions (13) and (14).

$$vd\_cmp = -Lq \cdot \omega e \cdot iq1^* - k \cdot Ld \cdot \omega e \cdot iq\_high^* \quad (13)$$

$$vq\_cmp = \omega e \cdot (Ld \cdot id1^* + \varnothing) + k \cdot Lq \cdot \omega e \cdot id\_high^* \quad (14)$$

The second terms in the right sides of expressions (13) and (14) are included to compensate for the speed electromotive forces induced by the higher harmonic current in the dq coordinate system in expressions (5) and (6).

Figure 9:
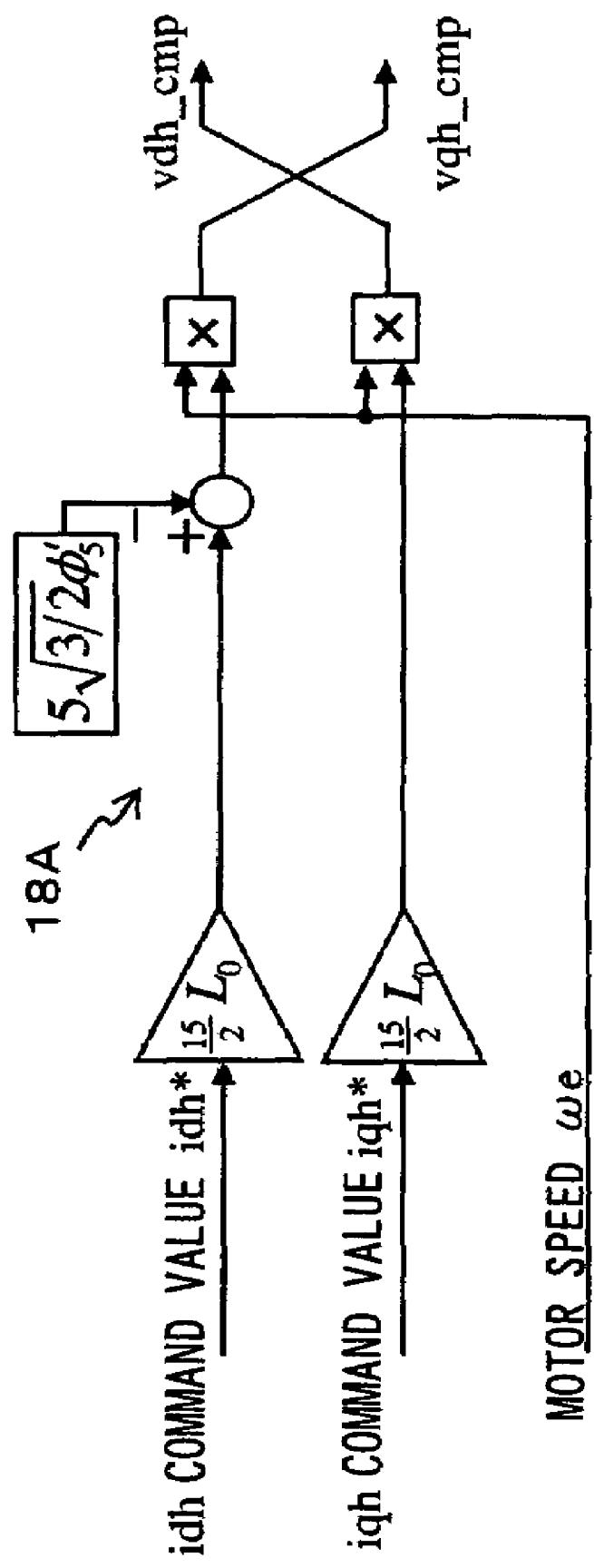
FIG. 9 shows in detail a structure that may be adopted in the dhqh speed electromotive force compensator.

By compensating for the speed electromotive forces induced by the higher harmonic current with the non-interactive controller 3A, the arithmetic operation executed by the dhqh speed electromotive force compensator 18 in the first embodiment shown in FIG. 2 can be partially omitted. FIG. 9 presents a structural example of the dhqh speed electromotive force compensator 18A in the second embodiment when the dhqh circuit equation of the motor is expressed as in expression (9). By adopting the dhqh speed electromotive force compensator 18A in the second embodiment, the arithmetic operation executed for the d-axis current command value id* and the q-axis current command value iq* in the dhqh speed electromotive force compensator 18 in FIG. 5 can be omitted.

With the motor control apparatus in the second embodiment, the current control in the dq coordinate system and the current control in the dhqh coordinate system can be implemented without allowing the dq-axis current controller 2 to interfere with the dhqh-axis current control. As a result, the conformity of the currents to the respective command values in the higher harmonic current control improves, and the extent of torque ripple can be reduced and the motor efficiency is improved even when the higher harmonic current control is adopted in a vehicle that accelerates and decelerates over frequent intervals.

In addition, since the motor control apparatus in the second embodiment includes the non-interactive controller 3A and the adders 4a and 4b provided to compensate for the adverse effect resulting from the d-axis and the q-axis interference on the output vd and vq from the dq-axis current controller 2 based upon the current command value id_high* and iq_high* in the dq coordinate systems obtained by converting the dh-axis current command value and the qh-axis current command value to values in the dq coordinate system, the d-axis and q-axis current command values id1* and iq1* both containing the higher harmonic component and the motor rotation speed ωe, the adverse effect of the d-axis and the q-axis interference is eliminated to further improve the response of the fundamental wave current control.

Furthermore, since it includes the dhqh speed electromotive force compensator 18a and the adders 19a and 19b provided to compensate for the adverse effect of the speed electromotive forces in the motor 11 on the output vdh and vqh from the dhqh-axis current controller 15 based upon the dh-axis current command value idh* and the qh-axis current command value iqh* and the motor rotation speed ωe, the adverse effect of the motor speed electromotive forces is eliminated to further improve the response of the higher harmonic current control.

Third Embodiment

Figure 10:
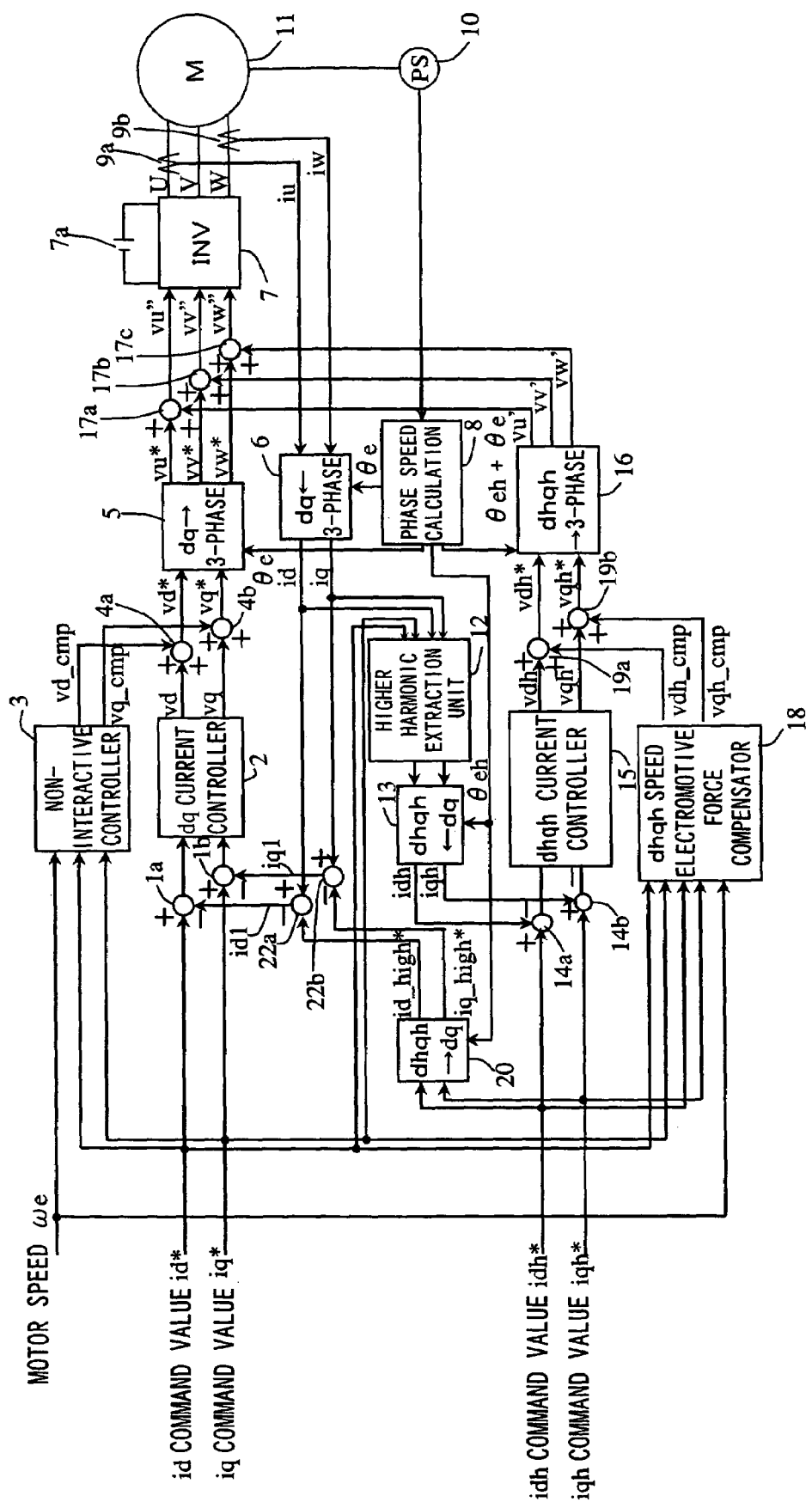
FIG. 10 is a control block diagram showing the structure of the motor control apparatus in a third embodiment.

FIG. 10 is a block diagram of the structure adopted in the motor control apparatus in the third embodiment. It is to be noted that the same reference numerals are assigned to components identical to those shown in FIGS. 1 and 2 and the following explanation focuses on the differences from the first embodiment.

In the motor control apparatus in the third embodiment, a d-axis current and a q-axis current (feedback values) that do not contain any higher harmonic component are generated by subtracting the higher harmonic component values id_high* and iq_high* (the output from the dhqh→dq converter 20) respectively from the d-axis current id and the q-axis current iq (feedback values) containing the higher harmonic component, and the d-axis current and the q-axis current are controlled based upon the control deviations relative to the fundamental wave component current command values id* and iq*.

The higher harmonic current command values id_high* and iq_high* resulting from the conversion executed by the dhqh→dq converter 20 (see expression (10)) are input to subtractors 22a and 22b respectively. The subtractors 22a and 22b respectively subtract the higher harmonic current command values id_high* and iq_high* from the d-axis current id and the q-axis current iq both containing the higher harmonic component and thus obtain a d-axis current id1 and a q-axis current iq1 that do not contain any higher harmonic component (expressions (15) and (16)).

$$id1 = id - id\_high^* \quad (15)$$

$$iq1 = iq - iq\_high^* \quad (16)$$

The subtractors 1a and 1b calculate the differences (current control deviations) (id*−id1) and (iq*−iq1) by subtracting the d-axis current id1 and the q-axis current iq1 (feedback values) constituted of the fundamental wave component alone respectively from the d-axis current command value id* and the q-axis current command value iq* containing the fundamental wave component alone. The differences thus calculated are input to the dq-axis current controller 2.

The motor control apparatus in the third embodiment eliminates the higher harmonic component from the d-axis current id and the q-axis current iq (feedback values) input to the dq-axis current controller 2, and, as a result, the dq-axis current control and the dhqh-axis current control can be implemented completely independently of each other without allowing the dq-axis current controller 2 to interfere with the dhqh-axis current control. Thus, the conformity of the currents to the respective command values in the higher harmonic current control improves, and the extent of torque ripple can be reduced and the motor efficiency is improved even when the higher harmonic current control is adopted in a vehicle that accelerates and decelerates over frequent intervals.

Fourth Embodiment

Figure 11:
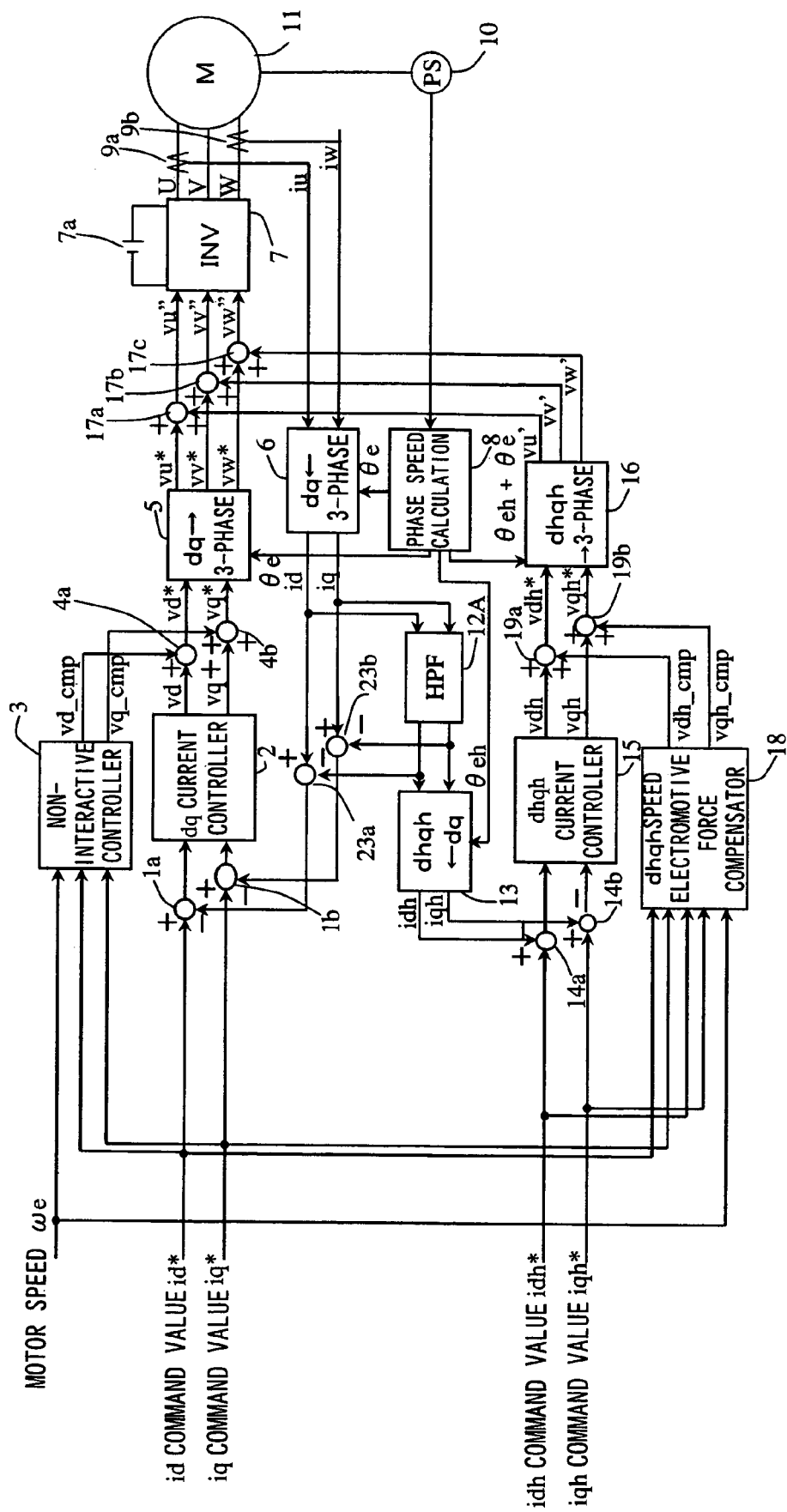
FIG. 11 is a control block diagram showing the structure of the motor control apparatus in a fourth embodiment.

FIG. 11 is a block diagram of the structure adopted in the motor control apparatus in the fourth embodiment. It is to be noted that the same reference numerals are assigned to components identical to those shown in FIGS. 1 and 2 and the following explanation focuses on the differences from the first embodiment.

In the motor control apparatus in the fourth embodiment, the higher harmonic current extraction unit is constituted by using a high-pass filter 12A to extract the d-axis higher harmonic current id_high and the q-axis higher harmonic current iq_high. Then, subtractors 23a and 23b subtract the higher harmonic currents id_high and iq_high respectively from the d-axis current id and the q-axis current iq (feedback values) containing the higher harmonic component, thereby generating a d-axis current and a q-axis current that do not contain any higher harmonic component and are constituted of the fundamental wave component alone. The control deviations of the d-axis current and the q-axis current thus generated relative to the d-axis current command value id* and the q-axis current command iq* are then input to the dq-axis current controller 2.

The motor control apparatus in the fourth embodiment achieves an advantage equivalent to that realized by passing the d-axis current id and the q-axis current iq through a low-pass filter with a cutoff frequency equal to that of the high-pass filter 12A. Namely, the higher harmonic component can be excluded from the feedback values at the dq-axis current controller 2. As a result, the dq-axis current controller 2 is not allowed to interfere with the dhqh-axis current control and the current control in the dq coordinate system and the current control in the dhqh coordinate system can be implemented completely independently of each other. Thus, the conformity of the currents to the respective command values in the higher harmonic current control improves, and the extent of torque ripple can be reduced and the motor efficiency is improved even when the higher harmonic current control is adopted in a vehicle that accelerates and decelerates over frequent intervals.

It is to be noted that the motor control apparatus may be alternatively achieved by using a low-pass filter having a cutoff frequency equal to that of the high-pass filter 12A and using values obtained by passing the d-axis current id and the q-axis current iq through this low-pass filter as d-axis and q-axis current feedback values.

The above described embodiments are examples, and various modifications can be made without departing from the spirit and scope of the invention. For instance, no restrictions are imposed with regard to the scope of the present invention by the specific type of motor 11 on which the control is implemented.

The disclosure of the following priority application is herein incorporated by reference:
Japanese Patent Application No. 2003-102480 filed Apr. 7, 2003

What is claimed is:

1. A motor control apparatus comprising:
  a fundamental wave current control device that implements feedback control on a fundamental wave component of a motor current flowing to a 3-phase AC motor in a dq coordinate system rotating in synchronization with the rotation of the motor;
  a higher harmonic current control device that implements feedback control on a higher harmonic component of the motor current in a dhqh coordinate system rotating with a frequency which is an integral multiple of a frequency of the fundamental wave component of the motor current;
  a command value calculating device that calculates an AC voltage command value by adding an output from the fundamental wave current control device to an output from the higher harmonic current control device and outputs the AC voltage command value to a power conversion device that generates a 3-phase AC voltage corresponding to the AC voltage command value; and
  a higher harmonic component eliminating device that eliminates the higher harmonic component of the motor current from a control deviation between a motor current feedback value and a fundamental wave current command value in the fundamental wave current control device.

2. A motor control apparatus according to claim 1, wherein:
  the higher harmonic component eliminating device converts higher harmonic current command values in the dhqh coordinate system to higher harmonic current command values in the dq coordinate system through coordinate conversion, and calculates a d-axis current command value and a q-axis current command value both containing the higher harmonic component by adding the higher harmonic current command values resulting from the coordinate conversion to fundamental wave current command values; and
  the fundamental wave current control device controls the fundamental wave component of the motor current so as to match motor current feedback values with the d-axis current command value and the q-axis current command value containing the higher harmonic component.

3. A motor control apparatus according to claim 2, further comprising:
  a rotation speed detection device that detects a rotation speed of the motor;
  a non-interactive control device that compensates for an adverse effect caused by interference of the d-axis and the q-axis on the output from the fundamental wave current control device based upon the fundamental wave current command values and the motor rotation speed; and
  a speed electromotive force compensating device that compensates for an adverse effect induced by a speed electromotive force in the motor on the output from the higher harmonic current control device based upon the fundamental wave current command values, the higher harmonic current command values and the motor rotation speed.

4. A motor control apparatus according to claim 2, further comprising:
  a rotation speed detection device that detects a rotation speed of the motor;
  a non-interactive control device that compensates for an adverse effect caused by interference of the d-axis and the q-axis on the output from the fundamental wave current control device based upon the higher harmonic current command values obtained through a conversion to the dq coordinate system, the d-axis current command value and q-axis current command value, both containing the higher harmonic component and the motor rotation speed; and
  a speed electromotive force compensating device that compensates for an adverse effect induced by a speed electromotive force in the motor on the output from the higher harmonic current control device based upon the higher harmonic current command values and the motor rotation speed.

5. A motor control apparatus according to claim 1, wherein:
  the higher harmonic component eliminating device converts higher harmonic current command values in the dhqh coordinate system to higher harmonic current command values in the dq coordinate system through coordinate conversion and calculates motor current feedback values which are the fundamental wave component by subtracting the higher harmonic current command values resulting from the coordinate conversion from motor current feedback values in the fundamental wave current control device; and the fundamental wave current control device controls the fundamental wave component of the motor current so as to match the motor current feedback values which are the fundamental wave component with fundamental wave current command values.

6. A motor control apparatus according to claim 1, wherein:

the higher harmonic component eliminating device executes high-pass filter processing on the motor current feedback value and calculates the motor current feedback value which is the fundamental wave component by subtracting results of the high-pass filter processing from the motor current feedback value; and the fundamental wave current control device controls the fundamental wave component of the motor current so as to match the motor current feedback value which is the fundamental wave component with the fundamental wave current command value.

7. A motor control apparatus according to claim 1, wherein:

the higher harmonic component eliminating device executes low-pass filter processing on the motor current feedback value to calculate the motor current feedback value which is the fundamental wave component; and the fundamental wave current control device controls the fundamental wave component of the motor current so as to match the motor current feedback value which is the fundamental wave component with the fundamental wave current command value.

8. A motor control apparatus comprising:

a fundamental wave current control means for implementing feedback control on a fundamental wave component of a motor current flowing to a 3-phase AC motor in a dq coordinate system rotating in synchronization with the rotation of the motor;

a higher harmonic current control means for implementing feedback control on a higher harmonic component of the motor current in a dhqh coordinate system rotating with a frequency which is an integral multiple of a frequency of the fundamental wave component of the motor current;

a command value calculation means for calculating an AC voltage command value by adding an output from the fundamental wave current control means to an output from the higher harmonic current control means and outputs the AC voltage command value to a power conversion means for generating a 3-phase AC voltage corresponding to the AC voltage command value; and a higher harmonic component elimination means for eliminating the higher harmonic component of the motor current from a control deviation between a motor current feedback value and a fundamental wave current command value in the fundamental wave current control means.

9. A method for controlling a motor by employing circuits including a fundamental wave current control circuit that implements feedback control on a fundamental wave component of a motor current in a dq coordinate system rotating in synchronization with the rotation of the motor and a higher harmonic current control circuit that implements feedback control on a higher harmonic component of the motor current in a dhqh coordinate system rotating with a frequency which is an integral multiple of the frequency of the fundamental wave component of the motor current, comprising:

eliminating the higher harmonic components of the motor current from a control deviation between a fundamental wave current command value and a motor current feedback value in the fundamental wave current control circuit;

calculating an AC voltage command value by adding an output from the fundamental wave current control circuit from which the higher harmonic component has been eliminated to an output from the higher harmonic current control circuit; and generating a 3-phase AC voltage corresponding to the AC voltage command value and applying the 3-phase AC voltage to a 3-phase AC motor.

* * * * *